(12) United States Patent
Stingl et al.

(10) Patent No.: US 7,406,232 B2
(45) Date of Patent: Jul. 29, 2008

(54) NON-ROUND FIBER OPTIC CABLE HAVING IMPROVED MAJOR AXIS CRUSH RESISTANCE

(75) Inventors: Andreas Stingl, Kronach (DE); Jody L. Greenwood, Hickory, NC (US); Kenneth D. Temple, Jr., Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/514,114

(22) Filed: Aug. 31, 2006

(65) Prior Publication Data

US 2008/0056650 A1 Mar. 6, 2008

(51) Int. Cl.
*G02B 6/44* (2006.01)
(52) U.S. Cl. ...................................................... 385/100
(58) Field of Classification Search .......... 385/100–114
See application file for complete search history.

(56) References Cited

U.S. PATENT DOCUMENTS

| | | | | |
|---|---|---|---|---|
| 4,199,225 A | * | 4/1980 | Slaughter et al. | 385/113 |
| 4,420,220 A | * | 12/1983 | Dean et al. | 385/113 |
| 6,314,224 B1 | * | 11/2001 | Stevens et al. | 385/113 |
| 6,493,491 B1 | | 12/2002 | Shen et al. | 385/113 |
| 6,654,527 B2 | | 11/2003 | Sakabe et al. | 385/114 |
| 6,836,603 B1 | * | 12/2004 | Bocanegra et al. | 385/113 |
| 2003/0068147 A1 | * | 4/2003 | Nechitailo | 385/114 |
| 2006/0133748 A1 | | 6/2006 | Seddon et al. | |
| 2006/0165355 A1 | * | 7/2006 | Greenwood et al. | 385/100 |
| 2007/0047884 A1 | * | 3/2007 | Storaasli et al. | 385/100 |

* cited by examiner

*Primary Examiner*—Sarah Song
(74) *Attorney, Agent, or Firm*—Michael E. Carroll, Jr.

(57) ABSTRACT

A non-round fiber optic cable that has improved crush performance is disclosed. The fiber optic cable includes at least one optical fiber, at least one strength element, and a cable jacket having a cavity. The at least one optical fiber is disposed within the cavity. The cable jacket further includes a concave upper wall and a concave lower wall disposed on opposite sides of the cavity, thereby improving the crush performance along the major axis of the optical fiber cable. In other embodiments, the fiber optic cable is a portion of a cable assembly.

28 Claims, 6 Drawing Sheets

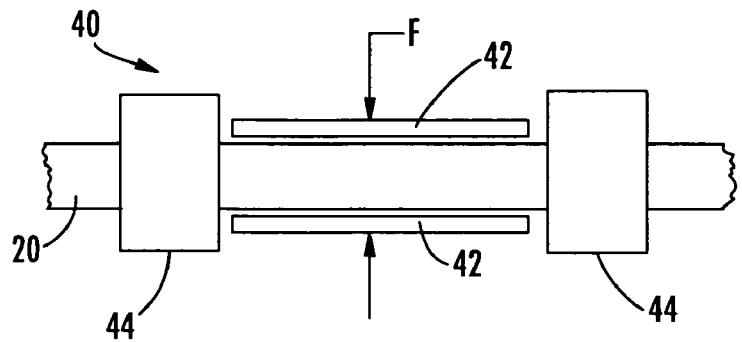
FIG. 3a
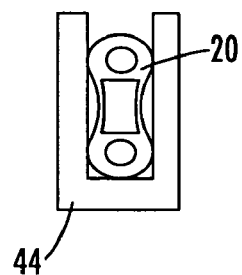
FIG. 3b
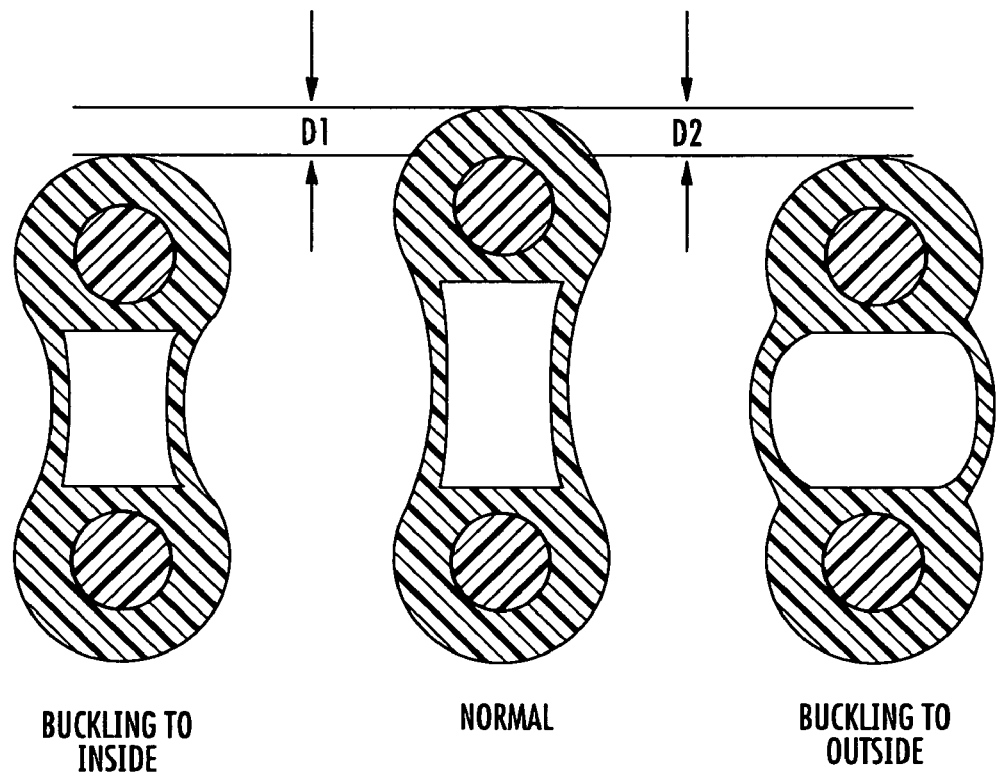
| BUCKLING TO INSIDE | NORMAL | BUCKLING TO OUTSIDE |
|---|---|---|
| FIG. 4a | FIG. 4b | FIG. 4c |

NON-ROUND FIBER OPTIC CABLE HAVING IMPROVED MAJOR AXIS CRUSH RESISTANCE

FIELD OF THE INVENTION

The present invention relates generally to fiber optic cables. More specifically, the present invention relates to non-round fiber optic cables having improved crush resistance along the major axis.

BACKGROUND OF THE INVENTION

Communications networks employ fiber optic cables to transport a variety of signals such as voice, video, data and the like. Fiber optic cables were first deployed for long-haul applications and generally used round cable cross-sections. These long-haul cables were designed to meet expected outdoor environmental and mechanical requirements. One example of the mechanical requirements is crush resistance. Simply stated, fiber optic cables in the field experience crush in the form of people walking on them, cars or other vehicles driving over them, having doors closed on them and many other situations where the fiber optic cable experiences crush forces. Generally speaking, because the round fiber optic cables used a generally symmetrical cross-section the crush performance was similar along any cross-sectional orientation.

One generally accepted method for testing fiber optic cable crush performance is to place the cable between two parallel plates and apply a crushing force. The two plates are of known length such as about 100 millimeters long with rounded edges on the plates to keep them from cutting into the optical fiber cable. Either a weight or device such as an Instron laboratory test unit is used to apply a compressive load to the optical fiber cable through the plates for a given time, while keeping the plates parallel. The load applied during testing can depend on the size and application for the fiber optic cable. By way of example, a common load for small optical fiber cables is 1100 Newtons applied for 10 minutes; however, other crush loads and times are possible. While the compressive load is applied, held, and/or removed optical tests, such as attenuation and continuity, are performed on the optical fibers in the cable to determine the optical performance. Additionally, the crushing test normally includes inspections for physical damage to the optical fiber cable and may include measurement of optical fiber cable deformation for analysis since these can also affect performance. One such crush procedure used by the industry is described in TLA/EIA 355.41, FOTP-41 Compressive Loading Resistance of Optical fiber cables.

As the deployment of fiber optic cables continues, the use of non-round fiber optic cable designs is increasing. For instance, as optical fiber cables push toward the subscriber non-round cable designs are being deployed. One reason non-round fiber optic cables are being deployed is because they are easy to install using a pressure type clamp, typically called a P-clamp. U.S. Pat. No. 2,068,368 shows one type of P-clamp for securing a cable to a structure such as a building or a pole in aerial applications. P-clamps are typically used for securing non-round drop cables since it makes the cable deployment efficient, reliable, and cost-effective. The P-clamp grips or clamps the non-round cable along the minor axis of cable. U.S. Pat. No. 6,493,491 discloses a non-round fiber optic cable design 10 like shown in FIG. 1 useful with P-clamps. More specifically, fiber optic cable design 10 uses a cross-sectional area of the reinforcing members 16 that is larger than the cross-sectional area of the cavity 14 for protecting the optical fibers 12 from crushing forces along the direction of the minor axis. The relatively small cavity size also helps crush performance in the direction of the major axis of fiber optic cable design 10. However, the use of a relatively small cavity limits the number of optical fibers within the cavity.

As the size of the cavity increases for non-round fiber optic cables providing suitable crush performance becomes difficult. In other words, designing a non-round fiber optic cable having a relatively large cavity with a reasonable cable cross-section, and suitable crush resistance along both the major axis and minor axis is challenging. The conventional design wisdom for providing acceptable major axis crush performance is to increase the wall thickness of the cable jacket between the cavity and the perimeter of the jacket. Although increasing the jacket thickness improves major axis crush performance, it also has the disadvantages of increasing the cross-sectional footprint along with increased material usage for the fiber optic cable. The present invention is directed to improving the major-axis crush performance of non-round fiber optic cables.

SUMMARY OF THE INVENTION

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principals and operations of the invention.

One aspect of the present invention is directed to a fiber optic cable having a cable cross-sectional area that is non-round. The optical fiber cable includes at least one optical fiber, at least one strength element, and a cable jacket having a cavity. The at least one optical fiber is disposed within the cavity. The cable jacket further includes a concave upper wall and a concave lower wall on opposite sides of the cavity, thereby improving the crush performance along the major axis of the optical fiber cable.

Another aspect of the present invention is directed to a fiber optic cable having a cable cross-sectional area that is non-round. The optical fiber cable includes at least one optical fiber, at least two strength elements, and a cable jacket having a cavity. The at least one optical fiber is disposed within the cavity and the cavity is disposed between the two strength elements. The cavity has a cavity cross-sectional area that is greater than about 25% of the cable cross-sectional area. The cable jacket further includes a concave upper wall and a concave lower wall, thereby improving the crush performance along the major axis of the optical fiber cable.

A further aspect of the present invention is directed to a fiber optic cable having a cable cross-sectional area that is non-round. The optical fiber cable includes at least one optical fiber, at least one strength element, and a cable jacket. The at least one optical fiber is disposed within the cavity and the cavity has a cavity cross-sectional area that is greater than about 25% of the cable cross-sectional area. The cable jacket further includes a concave upper wall and a concave lower wall and a radius of curvature for both a first major surface and a second major surface of the cable jacket are between about 20 millimeters and about 100 millimeters, thereby improving the crush performance along the major axis of the optical fiber cable. Additionally, fiber optic cables of the present invention are useful as cable assemblies that include a ferrule for optical connectivity.

BRIEF DESCRIPTION OF THE DRAWINGS

FIGS. 3a and 3b respectively schematically depict a side view and an end view of a fixture having a fiber optic cable therein used for testing the major axis crush performance of non-round optical fiber cables.

FIGS. 4a-4c depict the fiber optic cable of FIG. 2 in different modes of major axis crush.

DETAILED DESCRIPTION OF THE INVENTION

Figure 1:
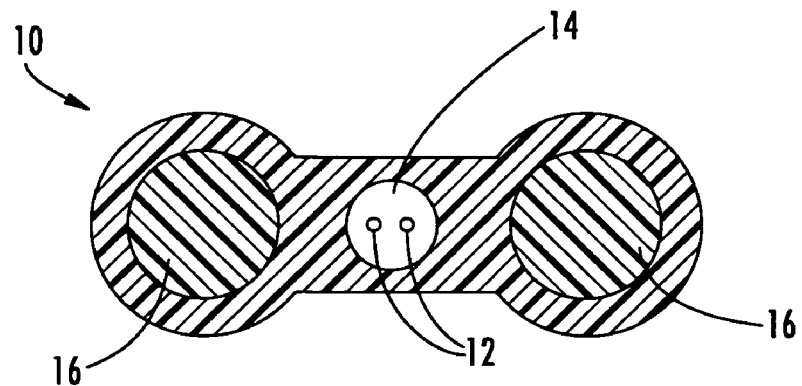
FIG. 1 is a cross-sectional view of a conventional non-round fiber optic cable.
Figure 2:
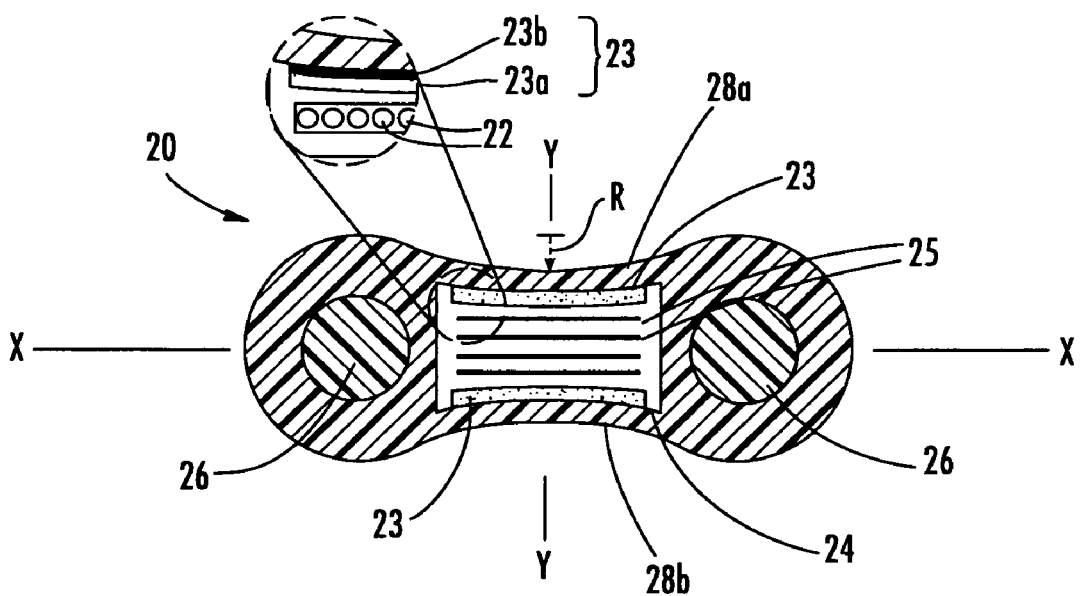
FIG. 2 is a cross-sectional view of a fiber optic cable according to one embodiment of the present invention.

Reference will now be made in detail to the present preferred embodiments of the invention, examples of which are illustrated in the accompanying drawings. Whenever practical, the same reference numerals will be used throughout the drawings to refer to the same or like parts. FIG. 2 depicts a cross-sectional view of a non-round fiber optic cable 20 according to the present invention. As depicted, fiber optic cable 20 has a major axis along a line X-X and a minor axis along a line Y-Y. Optical fiber cable 20 includes at least one optical fiber 22 and a filling material 23 disposed within a cavity 24, thereby forming a cable core (not numbered). Cable jacket 28 is disposed about the cable core to form a tubeless fiber optic cable and includes at least one strength element 26 therein. As shown optical fibers 22 of fiber optic cable 20 form a portion of a fiber optic ribbon 25 as known in the art. Fiber optic cable 20 has a relatively large cavity 24 while still providing suitable crush performance along the major axis (i.e., line X-X) due to the shape of cable jacket 28. Moreover, fiber optic cables of the present invention typically have a relatively small cross-section, for instance the major axis dimension is about 16 millimeters or less and the minor axis dimension is about 10 millimeters or less, but other suitable dimensions are possible.

Specifically, cable jacket 28 includes a first major surface 28a and a second major surface 28b where both first major surface 28a and the second major surface 28b have a concave surface, thereby improving the crush performance along the major axis of optical fiber cable 20. More specifically, one or both of the first major surface and the second major surface has a radius of curvature R of between about 20 millimeters and about 100 millimeters. Further, the upper and lower cavity surfaces (not numbered) are generally curved and matched with the radius of curvature of respectively of first major surface 28a and second major surface 28b of the cable jacket. In other words, cable jacket 28 has a concave upper wall 29a and a concave lower wall 29b (i.e. both the major surface and the cavity surface are concave) disposed on opposite side of the cavity with generally uniform thicknesses respectively along first major surface 28a and second major surface 28b as best shown by FIG. 4b. Concave walls 29a,29b have a thickness between about 1 millimeter and about 3 millimeters depending on the size of the fiber optic cable and the desired crush resistance. The crush performance of fiber optic cables using cable jackets with shapes according to the present invention is surprising since they have an improved major axis crush resistance compared with similar cable jackets having thicker wall portions with "flat" major surfaces (i.e., no curved portions at the major surfaces and cavity). Stated another way, the present invention uses the concave walls above and below cavity 24 for improving the major axis crush performance.

Fiber optic cable 20 has a relatively large cavity area compared with the fiber optic cable cross-sectional area, thereby advantageously allowing for relatively high optical fiber counts. Also, a relatively large cavity allows space for excess fiber/ribbon length and/or other cable components therein. For instance, the use of the non-stranded ribbon stack of fiber optic cable 20 requires a relatively high excess ribbon length ERL value such as about 0.5% or greater, thereby requiring space in the cavity for accommodating the same. Specifically, cavity 24 has a cavity cross-sectional area CCA as labeled in FIG. 4b that is about 25% or greater than a fiber optic cable cross-sectional area (not labeled). As used herein, fiber optic cable cross-sectional area means the area circumscribed by the perimeter of the fiber optic cable. Likewise, the cavity cross-sectional area CCA is defined as an area circumscribed by inner surfaces of the cavity. Cavity 24 can have any suitable size and/or shape and, generally speaking, is selected based on the components (e.g. optical fibers, ribbons, modules, tapes, etc.) disposed therein. By way of example, optical fiber cable 20 includes four ribbons each having 24-fibers so the ribbon stack has a width of about six millimeters and a height of about one and one-half millimeters. Consequently, cavity 24 uses a generally rectangular shape having concave upper and lower sides (i.e., for the concave walls) and has a relatively large size since it must house the ribbon stack therein. Moreover, cavity 24 is sized to also accommodate other components such as filling material 23 and also allowing suitable space for any ERL or excess fiber length. By way of example, cavity 24 has a major axis cavity dimension of about 8 millimeters and a minor axis cavity dimension of about 5 millimeters for housing the ribbon stack and filling material, thereby resulting in a cavity cross-sectional area CCA of about 40 square millimeters. The fiber optic cable cross-sectional area of fiber optic cable 20 is about 160 square millimeters, thus, the cavity cross-sectional area CCA to the fiber optic cable cross-sectional area for this design is about 25%. Of course, since different optical fiber counts for the fiber cable are possible the cavity size can vary and the ratio of cavity to cable areas can be greater than 25%. Illustratively, fiber optic cable 20 can have the same cavity cross-sectional area CCA as before with a fiber optic cable cross-sectional area of about 130 square millimeters, thereby yielding ratio for cavity to cable of about 33%. Likewise, a similar fiber optic cable having a cavity sized for four 36 fiber ribbons (i.e., a wider cavity for the 36-f ribbons) has a cavity to cable area ratio of about 40%.

Generally speaking, the concave upper wall and concave lower wall of cable jacket 28 have a relatively uniform thickness. However, due to high manufacturing line speeds and manufacturing variation it is difficult, if not impossible, to maintain the highly symmetrical shape of cable jacket 28 as depicted, but instead manufacturing maintains the general shape of the concave walls of cable jacket 28. Simply stated, the failure mode in major axis crush performance is buckling of the upper and lower wall portions as depicted in FIGS. 4a and 4c. Consequently, as the width of the cavity increases along the major axis, the wall thickness must increase to maintain the crush performance along the major axis. Illustratively, a non-round fiber optic cable sized for housing 12-fiber ribbons has suitable major axis crush performance using a "flat" upper and lower walls with a 1.0 millimeter uniform wall thickness while a similar design for housing 36-fiber ribbons (i.e., the cavity is wider) requires a 3.0 millimeter uniform wall thickness for suitable crush performance. Increasing the upper and lower wall thickness has the undesired effect of increasing the amount of jacket material used and increasing the fiber optic cable cross-sectional area. The concepts of the present invention are advantageous not only due to improved crush resistance, but they generally use less material and have a smaller fiber optic cable cross-section compared with cable jacket having "flat" upper and lower walls.

Fiber optic cables can use any suitable filling material that meets the required function(s). For instance, filling material 23 may provide many functions such as cushioning the optical fibers, coupling the optical fibers, and blocking the migration of water within the fiber optic cable. As shown, filling material 23 of fiber optic cable 20 is formed by two elongate tapes disposed within cavity 24. Each elongate tape 23 includes a compressible layer 23a and a water-swellable layer 23b that are attached together and provide a dry cable core, but other elongate tapes may omit the water-swellable layer. As depicted, the elongate tapes are disposed on both the top and bottom of the ribbon stack. In other words, the components form a elongate tape/ribbon sandwich with the first elongate tape disposed on a first planar side of the ribbon (or ribbon stack) and the second elongate tape being disposed on a the second planar side of the ribbon (or ribbon stack) within the generally rectangular cavity. Stated another way, planar surface(s) of the ribbon generally faces the planar surface of the elongate tape and the planar surface of the elongated tape is also generally aligned with the major axis inner surface of the cavity so that all of the major planar surfaces of the components are generally aligned within the generally rectangular cavity as depicted. Of course, other filling materials 23 besides elongate tapes are possible.

Optical fibers 12 used in the fiber optic cables of the present invention can have any suitable arrangement. Likewise, ribbons 25 can include any suitable design or variation. For instance, ribbons can use subunits or have other known designs for making it splittable by the craft. That is, there may be specific combinations of fibers which would be easily separated from the rest of the fibers in the ribbon. Optical fiber cable 20 also has two strength elements 26 disposed on opposite sides of cavity 24. Strength elements 26 normally provide both tensile strength and anti buckling resistance. Strength elements 26 may be any suitable material such as a dielectric (e.g., glass-reinforced plastic, rovings, combination thereof, or the like) or a conductive material (e.g., steel, copper, copper-clad steel, or the like). Strength elements 26 may include a surface treatment such as an ethylene acrylic acid (EAA) for enhancing the coupling of the strength element with the jacket as desired and/or a water-swellable coating for inhibiting the migration of water. Moreover, strength elements 26 may have other arrangements and/or structures. Cable jacket 28 is formed from a suitable polymer such as a polyethylene, but other polymers could be used. For example, cable jacket 28 could be formed from a flame-retardant material for riser or plenum applications.

Respectively, FIGS. 3a and 3b schematically depict a side view and an end view of a apparatus 40 for testing the crush performance of non-round fiber optic cables along the major axis using the method described above. Apparatus 40 holds the fiber optic cable in position while a pair of plates 42 apply a compressive force F along the major axis of the non-round fiber optic cable. More specifically, FIGS. 3a and 3b show fiber optic cable 20 held vertically within a pair of saddles 44 and plates 42 of known length (e.g., 100 millimeters) and compressive force F being applied while the plates are held parallel. As shown in FIG. 3b, fiber optic cable 20 is held tightly so that it is inhibited from rotating so that compressive force F is applied along the major axis X-X. Consequently, compressive force F is transferred from plates 42 through the jacket material on the ends of the optical fiber cable around the strength elements to the concave upper wall and concave lower wall on each side of the cavity.

Non-round fiber optic cables have more than one mode of failure for crushing along the major axis. FIGS. 4a-4c depicts fiber optic cable 20 (without the cable core for clarity) in a normal mode (i.e., no force applied) in FIG. 4b and crush modes (i.e, force applied) in FIG. 4a and FIG. 4c. More specifically, concave upper wall 29a and concave lower wall 29b can fail as: (1) buckling of the walls to the inside as shown by FIG. 4a; or (2) buckling of the walls to the outside as shown by FIG. 4c. In either case, the fiber optic cable has a respective deformation D1 or D2 compared with the normal mode (i.e., a deformation in length along the major axis) due to the buckling of concave upper wall 29a and concave lower wall 29b. If deformation D1 or D2 is too great it can cause unacceptable optical attenuation, damage to the optical fibers, and/or damage to the optical fiber cable.

Figure 5:
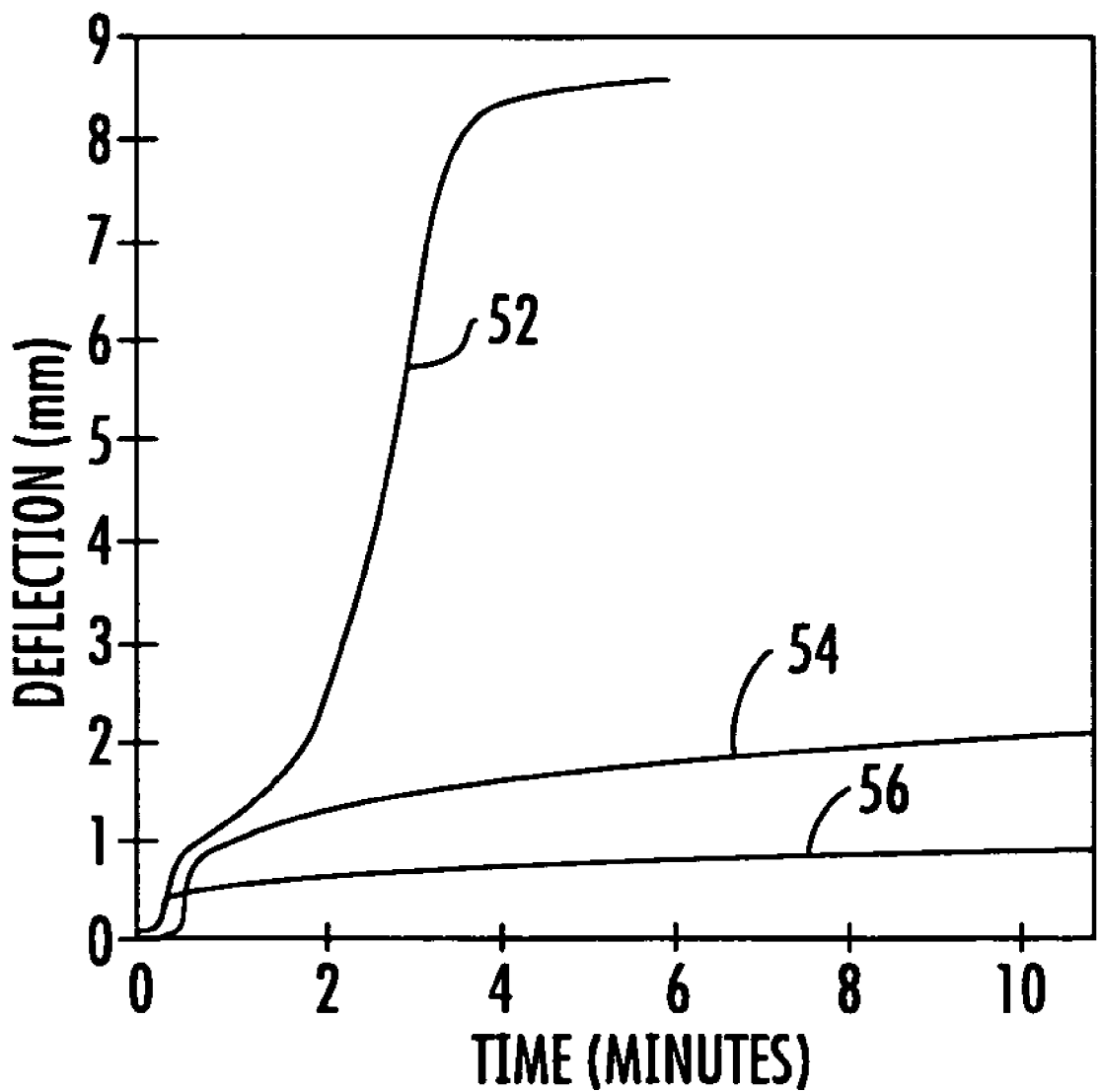
FIG. 5 is a graph representing a deflection during a major axis crush test for different non-round fiber optic cables.

FIG. 5 is a graph depicting the deformation along the major axis in crush testing for three fiber optic cables for the indicated time period. An 1100 Newton compressive force F was applied to all three fiber optic cables using apparatus 40. More specifically, the graph includes three curves representing the testing of three different non-round fiber optic cable designs. The three fiber optic cable designs are similar except for the shape of cable jacket and/or the thickness of wall portions. More specifically, each of the fiber optic cables tested included a cavity having a nominal height of about 5.2 millimeters and a nominal width of about 8.5 millimeters and GRP strength elements having a diameter of about 2.3 millimeters. Curve 52 represents a fiber optic cable having "flat" walls (i.e., straight walls) about 1.2 millimeters thick with a fiber optic cable cross-sectional area of about 110 square millimeters. As shown by curve 52, this fiber optic cable was severely deformed (e.g., more than 8 millimeters) during the crush test, thereby resulting in a catastrophic failure. Curve 54 represents a fiber optic cable similar to the cable of curve 52, expect that the "flat" wall thickness was increased from 1.2 millimeters to about 1.5 millimeters which also increased the fiber optic cable cross-sectional area to about 125 square millimeters. The fiber optic cable represented by curve 54 shows a dramatic improvement over the fiber optic cable represented by curve 52; however, it approached the maximum deformation and may cause undesirable optical attenuation. It was also observed that the fiber optic cables having "flat" walls generally buckle to the outside (i.e., like shown in FIG. 4c) during major axis crushing due to rotation of the cavity corners when the compressive force is applied. Curve 56 represents a fiber optic cable according to the present invention having concave upper and lower walls with a generally uniform thickness of about 1.5 millimeters and a fiber optic cable cross-sectional area of about 110 square millimeters. More specifically, the radius of curvature R for the fiber optic cable represented by curve 56 is about 30 millimeters and the upper and lower surfaces of the cavity have a similar radius of curvature for maintaining the generally uniform wall thickness. As depicted by curve 56, the fiber optic cable of the present invention had a deformation of less than 2 millimeters and, specifically, had a maximum value of about 1 millimeter for the ten minutes the crushing force was applied. Simply stated, the present invention fiber optic cable having the 1.5 millimeter thick concave walls represented by curve 56 surprisingly had only about half of the deformation of the fiber optic cable represented by curve 54 having the 2.0 millimeter thick "flat" walls.

Figure 6:
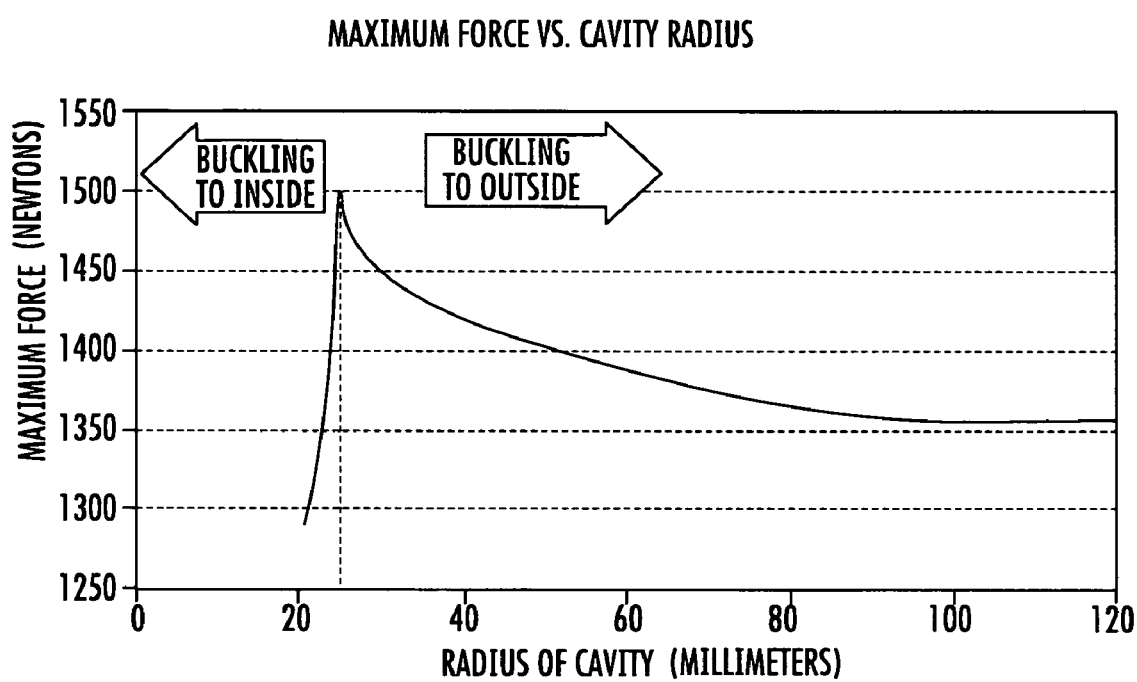
FIG. 6 is a graph representing finite-element modeling of a fiber optic cable similar to FIG. 2 for determining the maximum major axis load versus the radius of curvature.

To further understand the effect of using cable jackets having concave walls the inventors modeled a representative fiber optic cable design. FIG. 6 shows the results of a finite element modeling of the maximum force (to initiate buckling) for different radii of curvatures R for the cable jacket. For this modeling, the fiber optic cable used the same cavity size as before (i.e., cavity height of about 5.2 millimeters and cavity width of about 8.5 millimeters), a wall thickness of 1.2 millimeters, and a fiber optic cable end radius of 3.95 millimeters. For these design parameters, the modeling demonstrates an improved major axis crush performance for cable jackets having concave walls compared with cable jackets having "flat" walls for a range of curvatures from above about 20 millimeters to about 100 millimeters. As the radius of curvature increases the walls become flatter and this is demonstrated by the curve becoming generally horizontal beyond 100 millimeters (i.e., no further change in crush performance). As shown by the curve, as the radius of curvature R decreases below 100 millimeters the buckling mode is to the outside and the maximum force necessary to start the buckling increases until the buckling mode transitions to the inside. After the transition in buckling modes occurs the maximum force required to initiate buckling starts to decrease. The highest crush resistance and the least optical fiber cable deformation occurs at the transition point between the modes of inward and outward buckling, which occurs between about 25-30 millimeters for this design. However, the transition point for other cable jacket designs may vary. For instance, the transition point for modes of buckling is dependent on the wall thickness, the end shape of the fiber optic cable, and the size and shape of the cavity. The end shape of the fiber optic cable affects how the forces are transferred from the crushing surface to the end of the cable, for instance, if the cable has a squarer end shape it can change the buckling transition point.

Figure 7:
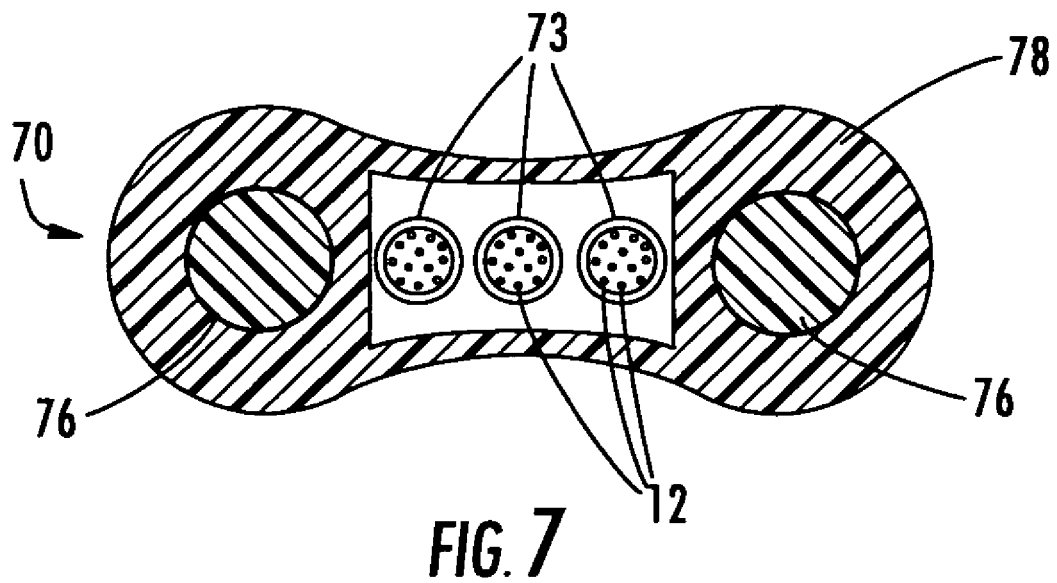
FIG. 7 is a cross-sectional view of another fiber optic cable according to the present invention.

FIG. 7 depicts another non-round fiber optic cable 70 according to the present invention. Fiber optic cable 70 is similar to fiber optic cable 20, except it packages optical fibers 12 in a different structure. In other words, fiber optic cable 70 includes a pair of strength element 76 disposed within a cable jacket 78 having concave walls (not numbered) for improving major axis crush resistance. However, the optical fibers 12 are disposed within a plurality of bundles 73 for organizing and protecting the same. Bundle 73 may be formed from any suitable material such as a robust polymer or thin material that is easily tearable by the craft without tools. Bundles 73 allow access to individual optical fibers therein without having to remove the same from a ribbon matrix material. Easily tearable materials are formed from a highly filled material, thereby making it easily tearable by the craftsman merely using his fingers and it will not stick to colored or tight-buffered optical fibers. Suitable materials may include a polybutylene terephthalate (PBT), a polycarbonate and/or a polyethylene (PE) material having a talc and/or an ethylene vinyl acrylate (EVA); however, other suitable materials are possible such as a UV-curable acrylate. Bundles 73 may include other suitable components such as a grease, water-swellable yarn, thread or tape, a ripcord, or other suitable component. Additionally, the cavity of fiber optic cable 70 may include any suitable filling material.

Figure 8:
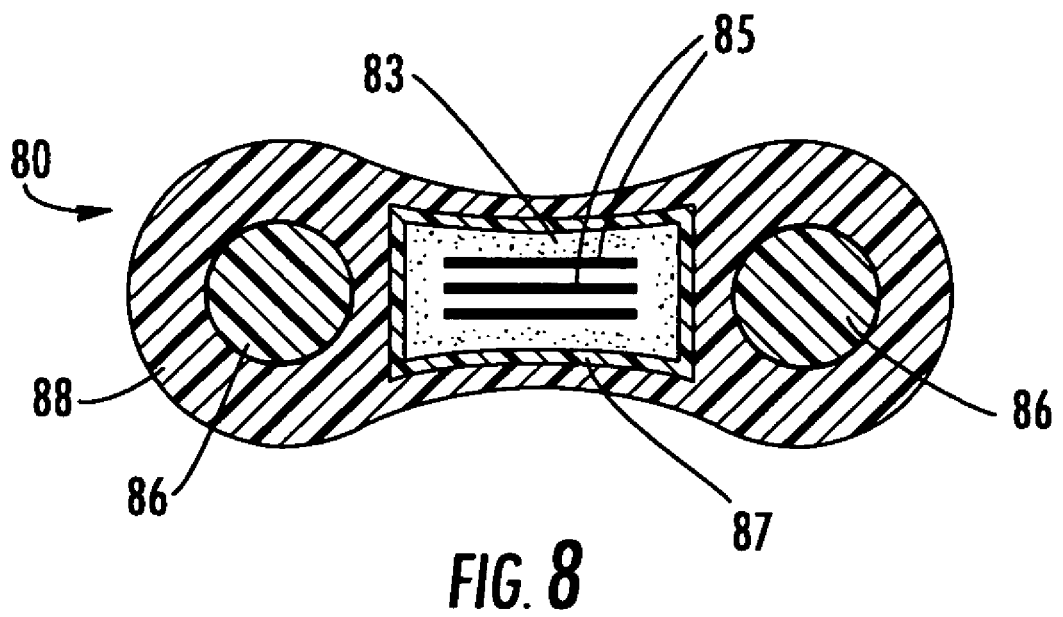
FIG. 8 is a cross-sectional view of still another fiber optic cable according to the present invention.

FIG. 8 depicts optical fiber cable 80 according to the present invention; which is similar to fiber optic cable 20. Like fiber optic cable 20, fiber optic cable 80 has a filling material 83 and ribbons 85 disposed in the cavity (not numbered) formed by a cable jacket 88 having a pair of strength elements 86 therein. Filling material 83 of fiber optic cable 80 is any suitable material such as a rease or gel, yarns, longitudinal tapes, and/or a powder. The yarns, tapes, or powders may also include a water-swellable component for blocking the migration of liquids such as water within the cavity. Additionally, fiber optic cable 80 includes an intermediate layer 87 such as a tube between the cavity and cable jacket 88. Intermediate layer 87 may have any suitable structure and/or multiple purposes. For instance, intermediate layer 87 can contribute to the crush performance of fiber optic cable 80, be used for routing the cable core once the cable jacket is breached such as within a closure, and/or include a water blocking material for aiding in the blocking the migration of water within the fiber optic cable. All of fiber optic cables depicted have a symmetrical cable jacket design about both the major axis and the minor axis; however, it is possible have asymmetrical fiber optic cable designs using the concepts of the present invention. This may be intentional or occur unintentionally during manufacturing.

Figure 9:
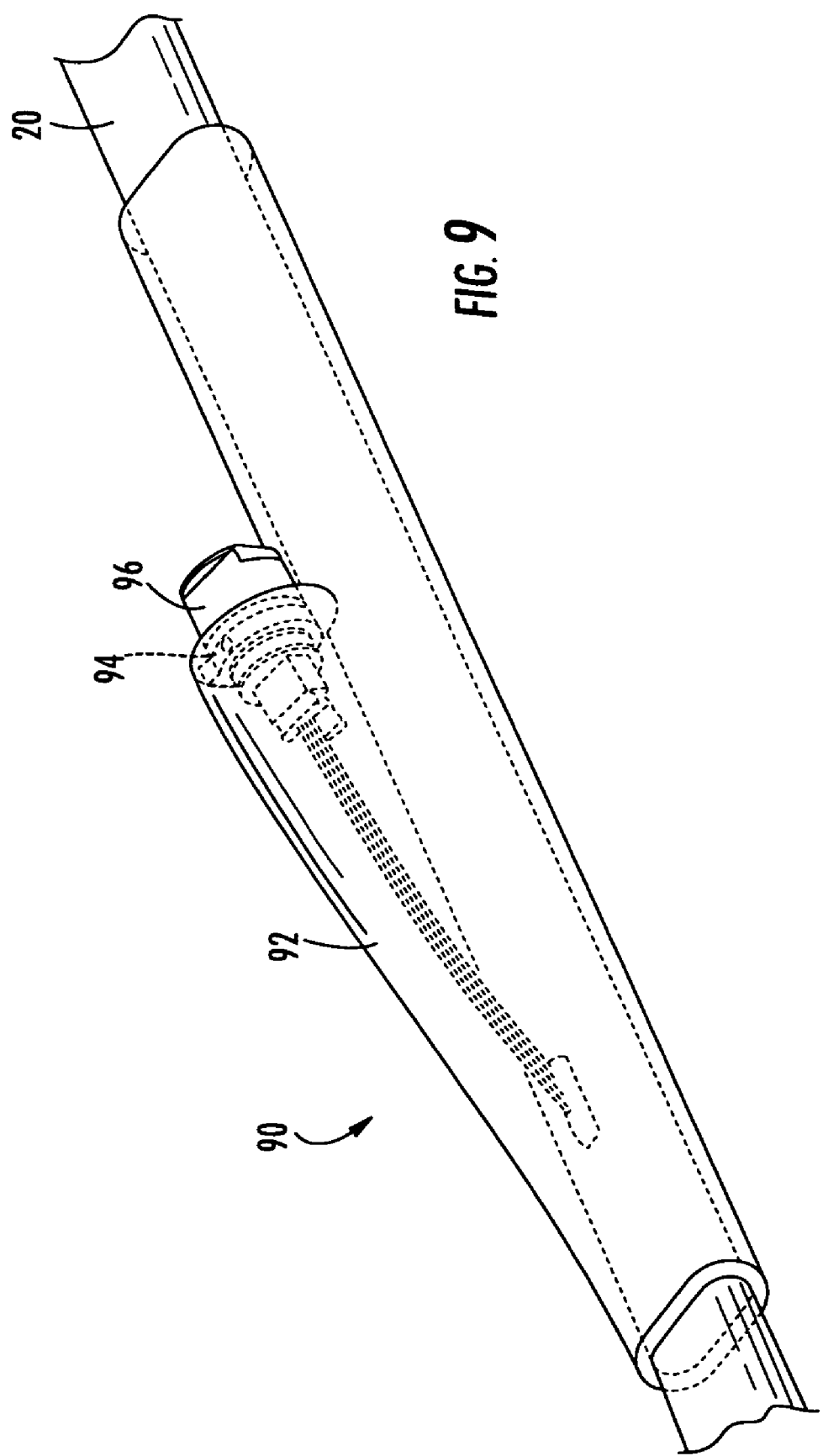
FIG. 9 depicts an explanatory cable assembly according to the present invention using the fiber optic cable of FIG. 2.

FIG. 9 depicts a cable assembly 90 that is useful as a distribution cable for providing rapid optical connection in the field. Cable assembly 90 includes fiber optic cable 20, a receptacle 94 (or other suitable joining point) having a ferrule (not visible), and a sealing portion 92 such as an overmold portion. Cable assembly 90 is advantageous because it has a relatively small cross-sectional footprint due to the arrangement between fiber optic cable 20 and receptacle 94. At preselected locations along optical fiber cable 20, cable jacket 28 is opened and the desired optical fibers are presented for access and distribution. Thereafter, the distribution optical fibers are attached to a ferrule that is a portion of receptacle, connector, or the like. Receptacle 94 is suitable for terminating a plurality of optical fibers 12 within a multifiber ferrule (not visible) of the receptacle. Receptacle 94 is preferably hardened and configured for environmental sealing of the assembly. Receptacle 94 also has a threaded portion (or other suitable structure) for securing the optical connection with a complimentary mating assembly such as a hardened connector. Receptacle 94 may also include a cap 96 that is removably attached thereto for protecting the ferrule, connector, and/or receptacle during overmolding and afterwards. Specifically, optical fibers 12 are routed to a multifiber ferrule (not visible) of receptacle 94 where they are attached in respective bores. After the desired structure is assembled, a sealing portion 90 such as an overmold, clamshell, or shrink tubing is applied thereover for protecting the assembly from the environment. Additionally, cable assembly 90 can have multiple receptacles, connectors, tether, or the like attached along its length; moreover, cable assembly 90 may locate these components on either or both major surfaces of fiber optic cable 20. Of course other cable assemblies that include a ferrule are possible such as fusion splicing the accessed optical fibers with a pigtail having a ferrule or attaching a tether cable.

Many modifications and other embodiments of the present invention within the scope of the claims will be apparent to those skilled in the art. For instance the concepts of the present invention can be used with any suitable optical fiber cable design. Different combinations of radius of curvature, concave wall thickness, and/or ratios of cross-sectional areas are possible with cavities designed to use different cable cores such as different numbers of optical fibers, ribbons and/or filling materials. It is intended that this invention covers these modifications and embodiments, as well as those also apparent to those skilled in the art.

What is claimed is:

1. A tubeless fiber optic cable having a cable cross-sectional area that is non-round, the tubeless fiber optic cable comprising:
   at least one optical fiber;
   at least one strength element; and
   a cable jacket the at least one optical fiber being disposed within a cavity having a generally rectangular shape where a major dimension of the cavity is generally aligned with a major axis of the tubeless fiber optic cable, and the cable jacket further includes a concave upper wall and a concave lower wall on opposite sides of the cavity, thereby improving the crush performance along the major axis of the tubeless fiber optic cable.

2. The tubeless fiber optic cable of claim 1, wherein a first major surface of the cable jacket has a radius of curvature of between about 20 millimeters and about 100 millimeters.

3. The tubeless fiber optic cable of claim 1, wherein the fiber optic cable can withstand a major axis crush force of 1100 Newtons over a 100 mm long section of the tubeless fiber optic cable applied for a duration of ten minutes with a deformation of about 2 millimeters or less.

4. The tubeless fiber optic cable of claim 1, further comprising at least two strength elements where the two strength elements are disposed on opposite sides of the cavity.

5. The tubeless fiber optic cable of claim 1, the cavity having a filling material selected from the group consisting of a foam, a gel, a grease, a yarn, a longitudinal tape, and a powder.

6. The tubeless fiber optic cable of claim 1, the at least one optical fiber being a portion of a fiber optic ribbon.

7. The tubeless fiber optic cable of claim 1, the cable jacket being flame retardant.

8. The tubeless fiber optic table of claim 1, further including a longitudinal tape disposed within the cavity, wherein the longitudinal tape includes a compressible layer.

9. The tubeless fiber optic cable of claim 1, the tubeless fiber optic cable being a portion of a fiber optic cable assembly.

10. A tubeless fiber optic cable having a cable cross-sectional area that is non-round, the tubeless fiber optic cable comprising:
    at least one optical fiber;
    at least two strength elements; and
    a cable jacket, the cable jacket having a cavity disposed between the at least two strength elements and having a cavity cross-sectional area, the at least one optical fiber being disposed within the cavity, wherein the cavity cross-sectional area is greater than about 25% of the cable cross-sectional area, the cable jacket further including a concave upper wall and a concave lower wall, thereby improving the crush performance along the major axis of the tubeless fiber optic cable.

11. The tubeless fiber optic cable of claim 10, wherein the cavity has a generally rectangular shape where a major dimension of the cavity is generally aligned with a major axis of the tubeless fiber optic cable.

12. The tubeless fiber optic cable of claim 10, wherein a first major surface of the cable jacket has a radius of curvature of between about 20 millimeters and about 100 millimeters.

13. The tubeless fiber optic cable of claim 10, wherein the tubeless fiber optic cable can withstand a major axis crush force of 1100 Newtons over a 100 mm long section of the tubeless fiber optic cable applied for a duration of ten minutes with a deformation of about 2 millimeters or less.

14. The tubeless fiber optic cable of claim 10, the cavity having a filling material selected from the group consisting of a foam, a gel, a grease, a yarn, a longitudinal tape, and a powder.

15. The tubeless fiber optic cable of claim 10, the at least one optical fiber being a portion of a fiber optic ribbon.

16. The tubeless fiber optic cable of claim 10, the cable jacket being flame retardant.

17. The tubeless fiber optic cable of claim 10, further including a longitudinal tape disposed within the cavity, wherein the longitudinal tape includes a compressible layer.

18. The tubeless fiber optic cable of claim 10, the tubeless fiber optic cable being a portion of a fiber optic cable assembly.

19. A tubeless fiber optic cable having a cable cross-sectional area that is non-round, the tubeless fiber optic cable comprising:
    at least one optical fiber;
    at least one strength element; and
    a cable jacket, the cable jacket having a cavity with a cavity cross-sectional area, the at least one optical fiber being disposed within the cavity, wherein the cavity cross-sectional area is greater than about 25% of the cable cross-sectional area, the cable jacket further including a concave upper wall and a concave lower wall, wherein the radius of curvature of both a first major surface and a second major surface of the cable jacket are between about 20 millimeters and about 100 millimeters; thereby improving the crush performance along the major axis of the tubeless fiber optic cable.

20. The tubeless fiber optic cable of claim 19, wherein the cavity has generally rectangular shape where a major dimension of the cavity is generally aligned with a major axis of the tubeless fiber optic cable.

21. The tubeless fiber optic cable of claim 19, wherein the tubeless optical fiber cable can withstand a major axis crush force of 1100 Newtons over a 100 mm long section of the tubeless fiber optic cable applied for a duration of ten minutes with a deformation of about 2 millimeters or less.

22. The tubeless fiber optic cable of claim 19, further comprising at least two strength elements, the at least two strength elements being disposed on opposite sides of the cavity.

23. The tubeless fiber optic cable of claim 19, the cavity having a filling material selected from the group consisting of a foam, a gel, a grease, a yarn, a longitudinal tape, and a powder.

24. The tubeless fiber optic cable of claim 19, the at least one optical fiber being a portion of a fiber optic ribbon.

25. The tubeless fiber optic cable of claim 19, the cable jacket being flame retardant.

26. The tubeless fiber optic cable of claim 19, further including a longitudinal tape disposed within the cavity, wherein the longitudinal tape includes a compressible layer.

27. The tubeless fiber optic cable of claim 19, the tubeless fiber optic cable being a portion of a fiber optic cable assembly.

28. A fiber optic cable assembly having a tubeless fiber optic cable with a cable cross-sectional area that is non-round, the fiber optic cable assembly comprising:
    at least one optical fiber;
    at least one strength element;

a cable jacket, the cable jacket having a cavity with a cavity cross-sectional area, the at least one optical fiber being disposed within the cavity, wherein the cavity cross-sectional area is greater than about 25% off the cable cross-sectional area and the cable jacket further includes a concave upper wall and a concave lower wall, thereby improving the crush performance along the major axis of the tubeless fiber optic cable; and at least one ferrule for providing optical connectivity.

* * * * *